Figure 1:
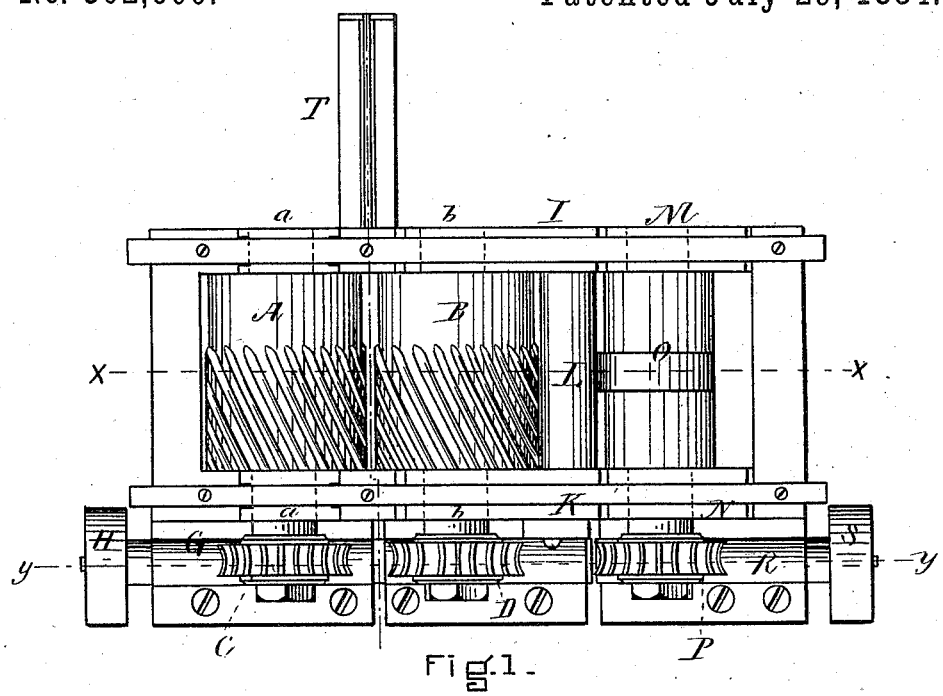

(No Model.) 2 Sheets—Sheet 1.

G. R. STETSON.
DEVICE FOR MANUFACTURING TWIST DRILLS.

No. 302,600. Patented July 29, 1884.

WITNESSES
J. Henry Taylor
M. J. Lowe.

INVENTOR
George R. Stetson
by Alex. P. Browne
attorney.

(No Model.) 2 Sheets—Sheet 2.
G. R. STETSON.
DEVICE FOR MANUFACTURING TWIST DRILLS.
No. 302,600. Patented July 29, 1884.
 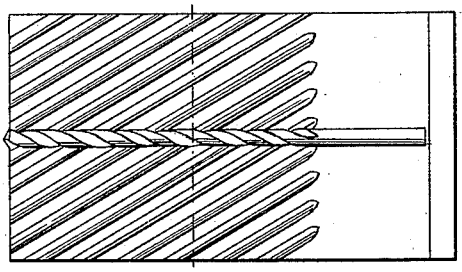
Fig. 8.    Fig. 6.
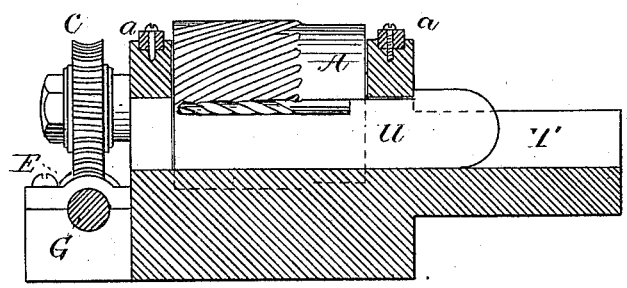
Fig. 4.
 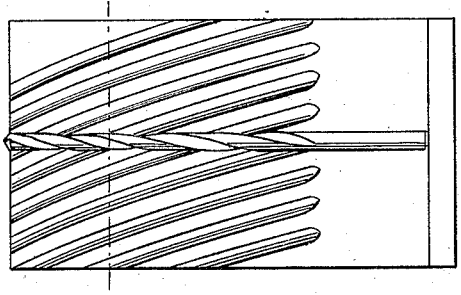
Fig. 7.    Fig. 5.
WITNESSES
J. Henry Taylor
M. J. Lowe
INVENTOR
George R. Stetson
by Alex. P. Browne,
attorney

UNITED STATES PATENT OFFICE.

GEORGE R. STETSON, OF NEW BEDFORD, MASSACHUSETTS, ASSIGNOR TO HIMSELF AND THE MORSE TWIST DRILL AND MACHINE COMPANY, OF SAME PLACE.

DEVICE FOR MANUFACTURING TWIST-DRILLS.

SPECIFICATION forming part of Letters Patent No. 302,600, dated July 29, 1884.

Application filed June 8, 1883. (No model.)

*To all whom it may concern:*

Be it known that I, GEORGE R. STETSON, of New Bedford, in the county of Bristol and State of Massachusetts, have invented certain new and useful Improvements in Devices for Manufacturing Twist-Drills, of which the following is a specification.

My invention has for its object the production of twist-drills by rolling them from a blank. Hitherto such drills have been formed in the following ways: first, by cutting away from the cylindrical blank the metal, spirally, to form the grooves; second, by rolling two straight grooves into opposite sides of the straight cylindrical blank, and then twisting it so as to make the grooves assume the spiral form required in the finished article; third, forming the grooves by means of a hammer and anvil of suitable shape, whereby the grooves are produced by repeated blows upon the blank, which is made to rotate during the operation, the groove thus being made spiral.

My improvement consists in devices for forming a twist-drill by rolling it directly from the blank, instead of forming it by cutting, hammering, or rolling and twisting it. The method now in use of forming the grooves by milling or cutting away the metal is necessarily a very slow one, and the drill the grooves of which are made in this way is open to the serious objection that the metal of it is cut away, and the whole drill thereby weakened at the very points where the strain is greatest, and where, consequently, the greatest strength is required. When the drill is formed by rolling the straight grooves first, and then twisting the drill afterward, the distortion of the metal in the twisting process, and the consequent disarrangement of its particles is such as to weaken and impair the drill; and this process involves, further, the risk of inaccuracy in the twisting operation, and consequent inevitable imperfection in the drill when finished. The method of forming the grooves of the drill by stamping or hammering the metal into the form of a groove by repeated blows is also objectionable, in that the blank in the course of this operation is constantly departing from the standard of its circumference, and requires to be constantly brought back to that standard by repeated swaging; furthermore, the regularity and perfection of the spiral can be obtained only by rotating the drill by some appliance additional to that which forms the groove, and in this way, also, there is introduced a liability to irregularity in the product.

Figure 2:
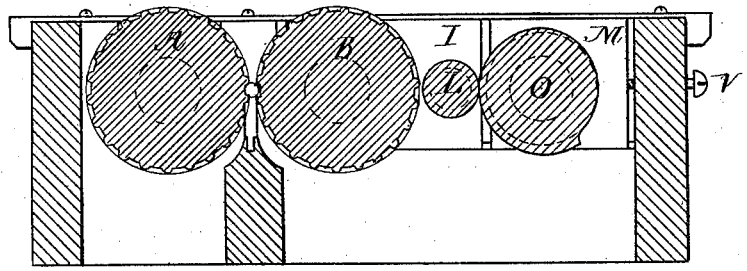
Figure 3:
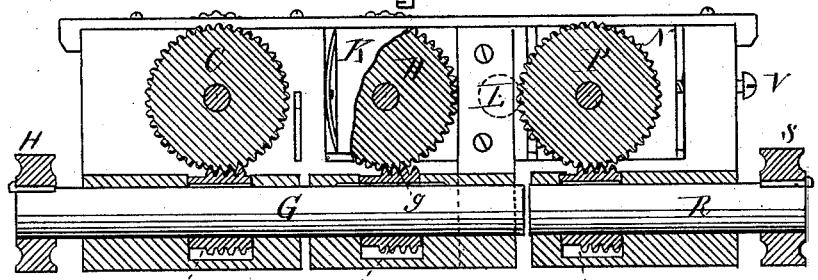

In the accompanying drawings, Figure 1 is a plan, and Fig. 4 an end view, of the machine. Figs. 2 and 3 are views in section. Figs. 5 and 6 are enlarged plan views in projection, and Figs. 7 and 8 views in section, illustrative of the peculiar formation of the operating-faces of the rolls.

In the production of the drill, I cause a suitable blank to be acted upon by rolls A B, having formed upon their acting-surfaces elevations at suitable intervals, and suitably formed intermediate portions. The projecting portions or elevations lie upon the rolls at an angle to the line or length of the drill-blank, the amount of such angle and the form of the projections being regulated by the amount of the pitch or twist and the contour required in the finished drill.

Fig. 5 shows in flat projection a roll, the projecting portions or elevations of which will give what is called an "increased twist-drill," by reason of the curving or bending of the projecting portions, as shown. Fig. 6 shows in the same way a roll to give a regular twist-drill, the projecting portions not being curved, and the spiral or twist being consequently regular throughout. The intermediate portions, or those lying between the elevated or projecting portions, form the land of the drill, or that part of the side of the drill between the grooves before mentioned. It is generally desirable that the stock forming these lands should not be of the same diameter throughout their width, but should decrease in diameter, or that the land should slope away from the cutting-edge of each groove. This cutting-edge is on the one or other hand of the groove, according to the direction in which the drill is intended to be turned or driven in the operation of boring or drilling. To give the land this described form, the intermediate portions before described upon the rolls are formed in the opposite way, not of the same height or level throughout their width, but lowest at that part which forms the land next the cutting-edge, and gradually higher across the width of the intermediate portion.

Fig. 7 shows the section of a roll (projected) in which the parts which form the land are left in a regular plane. Fig. 8 similarly shows a roll which will give a sloping or retreating land, the acting surfaces being inclined or retreating, as the section shows.

In forming the grooves or the lands in the drill by rolling between rolls, I produce the required pressure or contact between the rolls and the drill in a gradually-increasing amount by causing the rolls gradually to come nearer in the course of their work, and thus perform the operation of rolling the drill from the blank at a great gain in the wear upon the devices employed. This way of producing a gradual increase in the effect of the rolls by causing their gradual approach is the one which I propose to describe herein. I have tried other ways which have worked well, but intend to make them the subject of subsequent applications.

A feature of my herein-described improvement is that it is wholly automatic—that is to say, that after the rolling of the blank has once begun the whole operation of producing the drill by rolling is automatic. A further feature of distinction is that the grooves and lands may be formed simultaneously and by one operation, the advantages of which I have elsewhere pointed out herein.

I will now proceed to describe an organized mechanism embodying my improvement in the best form now known to me.

Two cylindrical rolls, A and B, are mounted side by side. At one end of the shaft carrying each of these rolls is a worm-gear, C D, these gears engaging with worms E F upon a shaft, G, provided with a pulley, H, whereby power is supplied for revolving the rolls. One of the rolls, A, revolves in stationary or not laterally-movable bearings $a\ a$ in the frame of the machine. The other roll, B, has its bearings in sliding blocks I K, whereby this roll B may approach or withdraw from the roller A. The worm F, being attached to the shaft G by means of the spline or feather joint $g$, advances upon the shaft in the spline as the blocks M N and the gear D advance, the box surrounding this worm F and shaft G being attached to the block M and advancing with it, and thereby causing the worm F and roller B to advance simultaneously, thereby maintaining the exact relations of roll A to B. This same part of the mechanism operates similarly, but in the reverse direction, when the boxes M N are forced backward, as is hereinafter explained. The ratio of the rate of rotation of the rolls to the rate of their approach is determined by the ratio between the speeds at which the mechanisms which produce the results are run. This will vary with the size, &c., of the drill to be cut, and can best be determined by practice for any particular size, &c., of drill. In the same blocks, and back of the roll B, is mounted a plain cylinder, L, free to revolve on its bearings in the blocks. A second set of blocks, M N, are also provided, which are adjustably set in the frame of the machine, back of the blocks I K. Within these blocks M N is mounted a cam-bearing or cam-faced cylinder, O, revolving on bearings in the blocks M N, and the shaft carrying this cylinder O is extended, and is provided at its outer end with a worm-gear, P, connecting with a worm, Q, mounted upon a shaft, R, provided with a pulley, S, whereby power is supplied for driving the cam-faced cylinder O.

A trough or slot, T, is placed at one side of the machine, opposite the point where the faces of the rolls A B most nearly approach, and a passage-way from the trough leads through the frame of the machine and into the space between the rolls A B, and a slide or pusher, U, is fitted to work backward and forward in this trough or slot, to carry the drill-blank to the rolls. The forward or back position of the cam-faced cylinder O is governed by means of the adjusting-screws V V, whereby the blocks M N may be advanced toward or drawn back from the blocks I K, carrying the cylinder or friction-roller L and the roll B, and springs $b$ are interposed between these blocks I K and the solid portions of the frame in which are the bearings of the roll A.

The operation of the machine is as follows: The rolls A B being properly set and at a sufficient distance apart, a drill-blank is introduced between their adjacent working-faces by means of the feed-slide or pusher U, working in the slot or trough T. Power now being applied to the pulley H, causes the worms E F, engaging with the gears C D, to revolve the rolls A B, the faces of which act upon the drill-blank and cause it to rotate, and at the same time roll into its surface the spiral grooves and the intermediate lands, as before described. In order to gradually increase the pressure of the rolls A B to catch and act upon the drill-blank, the rolls A B are brought gradually closer together during the rolling. This operation is accomplished by means of power applied to the pulley S, which operates the worm Q and gear P, and thus causes the cam-faced cylinder O to rotate. As this revolves, the cam-face engaging with the cylinder L gradually forces the roll B toward the roll A while the two are still revolving, and they thus seize and act upon the drill-blank with gradually-increasing pressure. The rate of advance of roll B is governed, as is obvious, by the rate of rotation of the pulley S and by the pitch or inclination of the cam-face; and the extent of the forward throw of the cam-faced shaft O is regulated by means of the adjusting-screws V V moving the blocks M N, as before explained. The return of the roll B to its original distance from the roll A is accomplished by means of springs $b'\,b'$, which are compressed by the advance of the blocks I K, carrying the roll B, and which force those blocks and the roll back when the pressure of the cam is removed, or when the cut-away portion of the cam-face on the shaft O is opposite the friction-roller L.

It is obvious that the gradual increase of pressure of the rolls A B may be obtained by causing each to approach the other, as well as by giving such a motion to one only. It is also obvious that the gradual forward motion of either roll might be obtained by other means than the cam action described and shown, and the backward motion of either of the rolls might, in like manner, be obtained by the use of mechanism operating positively to withdraw them at the proper time, instead of the springs $b'\,b'$. It will also be seen that a bearing against which the cam action is to be exerted might be secured by the use of some equivalent or substitute device for the rotating friction-roller L, and that the power for driving the rolls A B and the cam-roller O might be applied directly to the shafts of those rolls, rather than through the intervention of worms and gears, as described, and that in practice, the feeding mechanism might be connected with and operated by the same source of power that drives the cam or the rolls. In fact, various other modifications might suggest themselves in other points of detail in the construction of the machine; but I prefer those shown and described as being, according to my present belief, best adapted for the various objects for which they are employed in this machine.

I claim—

1. In a machine for rolling twist-drills, as described, a pair of opposed rolls, each having on its operating-face a series of independent diagonal beads or projections of the character and for the purposes described.

2. In a machine for rolling and clearing twist-drills at a single operation, a pair of opposed rolls, each having on its operating-face a series of independent diagonal beads or projections and an interposed series of independent diagonal faces of the character and for the purpose described.

3. In a machine for rolling twist-drills, the combination of the roll A, mounted on stationary bearings, the roll B, mounted in movable bearings, the friction-roller L, the cam-cylinder O, with means for revolving the same, and the springs $b'\,b'$, whereby motion of the roll B toward or away from the roll A is obtained while the two are revolving.

4. In a machine for rolling twist-drills, the combination of the roll A, mounted on stationary bearings, the roll B, mounted in movable bearings, the friction-roller L, the cam-cylinder O, and means for revolving the same, for causing the roll B to move toward the roll A while the two are revolving.

5. In a machine for rolling twist-drills, the combination of the rolls A B, friction-roller L, cam-cylinder O, sliding blocks M N, and adjusting-screws V V.

6. In a machine for rolling twist-drills, the combination of the rolls A B, and the feeding trough or slot T, and the slide U, substantially as described.

7. In a machine for rolling twist-drills, the combination of the roll A, mounted in stationary bearings and provided with a gear, C, the roll B, mounted in movable bearings and provided with a gear, D, the fixed worm E, the splined or sliding worm F, and a shaft and pulley, G H, common to and operating both worms and gears, all substantially as herein set forth, and for the purposes herein specified.

8. In a machine for rolling twist-drills, the combination of the roll B, mounted in movable bearings, with the worm-gear D, worm F, and shaft G, said worm and said shaft being united by means of a spline or feather joint, and means, substantially as described, for causing the said worm and gear, while in engagement, to move over or along the shaft G in accordance with the motion of the roll B.

GEORGE R. STETSON.

Witnesses:
 ALEX. P. BROWNE,
 J. HENRY TAYLOR.